United States Patent [19]

Santini

[11] 4,399,393

[45] Aug. 16, 1983

[54] ACCELERATOR CONTROL FOR ELECTRIC VEHICLES

[75] Inventor: John Santini, Centerreach, N.Y.

[73] Assignee: TII Electronics, Inc., Copiague, N.Y.

[21] Appl. No.: 212,600

[22] Filed: Dec. 3, 1980

[51] Int. Cl.³ .............................................. H02P 1/18
[52] U.S. Cl. ................................... 318/313; 318/551; 318/345 R; 318/139; 250/230
[58] Field of Search ............... 250/229, 230; 318/480, 318/551, 313, 345 R, 345 E, 345 G, 301, 305, 350, 139

[56] References Cited

U.S. PATENT DOCUMENTS

| B 380,310 | 1/1975 | Padgitt | 250/229 X |
|---|---|---|---|
| 3,641,413 | 2/1972 | Ohntrup et al. | 318/480 |
| 3,755,681 | 8/1973 | Montross | 250/229 |
| 3,814,199 | 6/1974 | Jones | 250/229 X |
| 3,994,588 | 11/1976 | Marx | 250/230 X |
| 4,019,606 | 4/1977 | Caputo et al. | 318/480 X |
| 4,152,588 | 5/1979 | Klatt et al. | 250/230 |
| 4,251,723 | 2/1981 | Speidel et al. | 250/229 |
| 4,284,885 | 8/1981 | Swensen | 250/229 X |
| 4,310,788 | 1/1982 | Hamyu et al. | 310/551 |
| 4,315,147 | 2/1982 | Harmer | 250/229 X |

Primary Examiner—B. Dobeck
Assistant Examiner—Richard M. Moose
Attorney, Agent, or Firm—Michael F. Brown; Ralph R. Barnard

[57] ABSTRACT

An accelerator control for field-controlled DC motors, or other applications requiring non-linear response to linear control input. The control uses a photodetector detecting light reflecting from a movable vane connected to the control input.

5 Claims, 6 Drawing Figures

ACCELERATOR CONTROL FOR ELECTRIC VEHICLES

REFERENCE TO DISCLOSURE DOCUMENT

This application was the subject, in part, of Disclosure Document Ser. No. 87,917 filed Feb. 4, 1980.

BACKGROUND OF THE INVENTION

This invention pertains to the field of controlling devices for electric motors, or for any other devices requiring a non-linear response to a linear mechanical control input. More specifically, it pertains to improved photoelectric means for translating accelerator pedal movement into changes in motor speed for electric vehicles.

It has long been known that one method of controlling the speed of a DC motor is to operate the motor in a configuration in which the armature, or rotating portion, of the motor is connected directly to the power source, and the field, or stationary portion, is separately excited to provide speed control. As the field excitation is decreased the motor gains speed. This method, called "field control", is being increasingly used in electric vehicles, either alone or in combination with some form of armature control. Field control has the advantage that field currents are relatively small compared to the armature currents, thus they are easier to control. Field controllers are less expensive and dissipate less heat than armature controllers.

A problem arises in using a field controlled motor in an electric vehicle in that the response of the motor to a change in field excitation is highly non-linear (See FIG. 2). If a linear device, such as a conventional potentiometer, is used in the control circuit, the first half of the accelerator pedal travel produces little change in motor speed, and the second half produces a far greater response. This produces a very unnatural control feeling for the driver. Nevertheless, the potentiometer, or a similar variable resistance element (i.e. a compression resistor as in Schenkelberger, U.S. Pat. No. 3,114,871), has in the past been the standard device used on speed controls in electric vehicles (see, e.g., Thompson, U.S. Pat. No. 3,989,990).

The non-linearity problem can be overcome to an extent through the use of a custom non-linear potentiometer, but these tend to be expensive. Moreover, one skilled in the art will recognize that potentiometers are prone to wear with use. Most commonly used potentiometers use a carbon element which wears badly with time, creating "noise" on the signal and erratic response before failing. In the rugged environment of a motor vehicle they tend to accumulate dirt and moisture, which creates yet more "noise" and accelerates failure still more.

Some controllers have incorporated magnetic-sensitive devices such as Hall-effect semiconductors (Berman, U.S. Pat. No. 3,818,292; Elliott, U.S. Pat. No. 3,562,616) or variable transformers (Truemper, et al, U.S. Pat. No. 3,469,164) as the variable element. These may solve the linearity problem, but tend to expensive and complicated in operation. Moreover, the Hall effect devices can be sensitive to stray magnetic fields and variations in temperature, as are commonly found in the environment of an electric vehicle.

The use of a photoelectric detector coupled with a light source to effect changes in motor speed has been known for many years. Stoekle, U.S. Pat. No. 1,582,702, was typical of these methods of photoelectric control, using a shaded screen between the photodetector and the light source. Alternatively, an iris or shutter may be interposed in place of the screen, as in the Singer sewing machine control disclosed in Bostrom, U.S. Pat. No. 3,145,304. The non-linear response desired may be derived, though not easily changed, by mechanical linkages or suitable shading of the screen. Although a step forward, these systems are still prone to problems from the dirt, moisture, and vibration inherent in motor vehicle operation, and can be complicated and expensive to build.

Thus, it is an object of this invention to provide an improved accelerator control for electric motors.

It is a further object of the invention to provide an accelerator control for electric vehicles whose output characteristics may be varied to provide a linear pedal position to motor speed response curve.

It is a further object of the invention to provide an accelerator control which is rugged, simple, and relatively impervious to the vibration, noise, moisture, and dirt of a vehicular environment.

It is a still further object of the invention to provide an accelerator control for electric vehicles which can be used with a minimum of additional parts or external wiring.

Other objects of the invention will become obvious to one skilled in the art as this disclosure progresses.

SUMMARY OF THE INVENTION

The present invention is directed to an accelerator control for electric motors, especially field-controlled electric motors in electric vehicles, using a photodetector and light source reflecting from a moving vane. The output characteristics of the control may be varied to match the response of a motor to provide a linear response to accelerator control movement, or for any other purpose.

DESCRIPTION OF THE INVENTION

Figure 1:
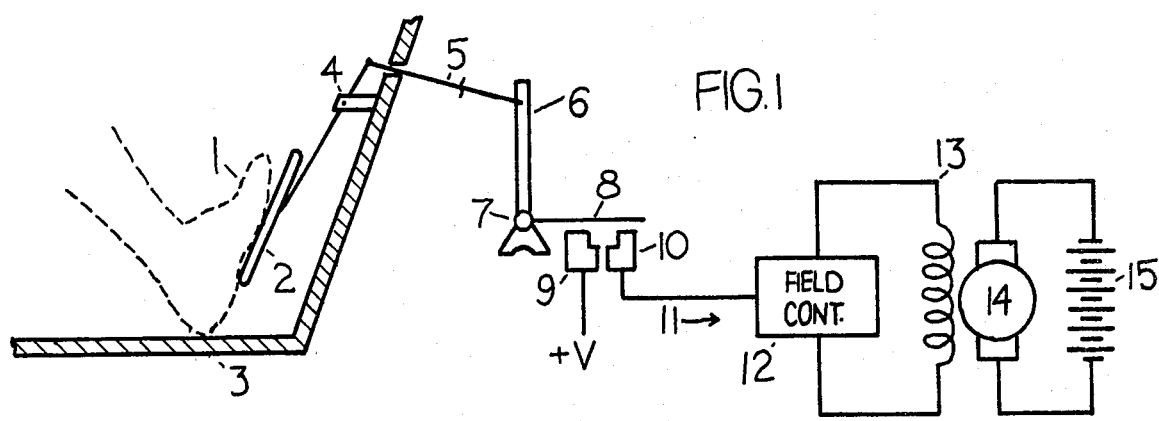
FIG. 1 shows an electric vehicle control set-up including the invention.

FIG. 1 shows the invention in use in a motor vehicle control system. The vehicle accelerator pedal (2) is mounted above the floor (3) of an electric vehicle on an arm (4). The pressure of the operator's foot (1) causes the arm to exert pressure on a linkage (5) attached to a crank (6). The crank is mounted on a pivot (7) along with a vane (8) made of a non-transparent substance. A light source (9) is mounted such that the light from the source reflects from the vane into a photodetector (10). The photodetector output (11), which may be a voltage (as in selenium photocells), or a current (as in phototransistors) or a resistance (as in CdS photocells), is connected to the control input of a conventional field controller circuit (12) which variably excites the field (13) of a DC motor (14) whose armature is connected to a power source, here a battery (15). Conventional details of mounting, power supply, etc, have been omitted for clarity.

Figure 2:
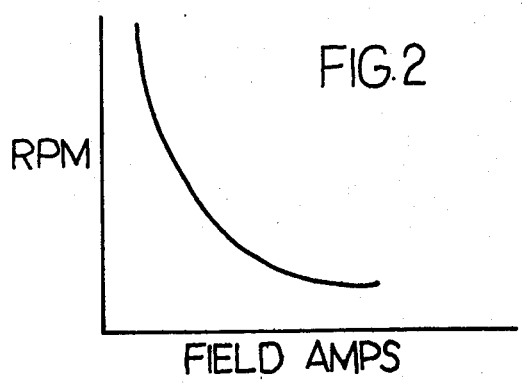
FIG. 2 is a graph of the response of a field-controlled DC motor to changes in field excitation.
Figure 3:
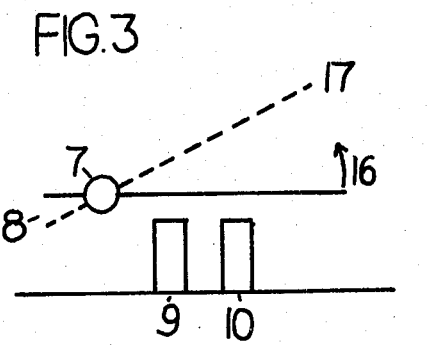
FIG. 3 shows the relationship of the elements of the invention in one arrangement.
Figures 4, 5:
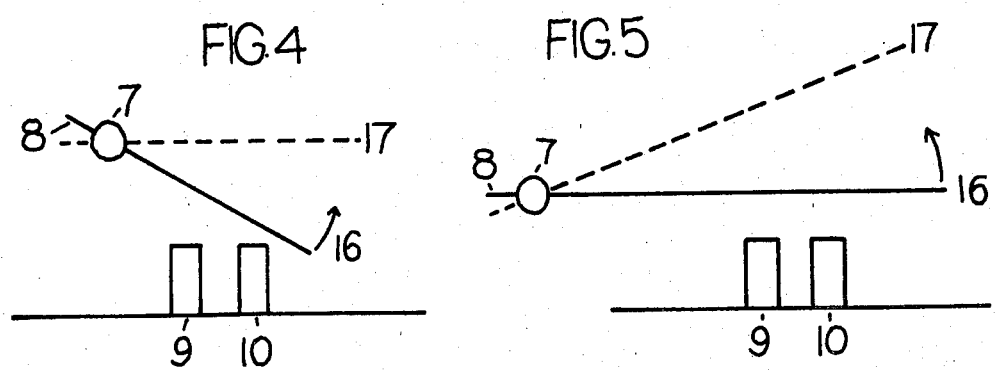
FIGS. 4 and 5 show other possible arrangements.
Figure 6:
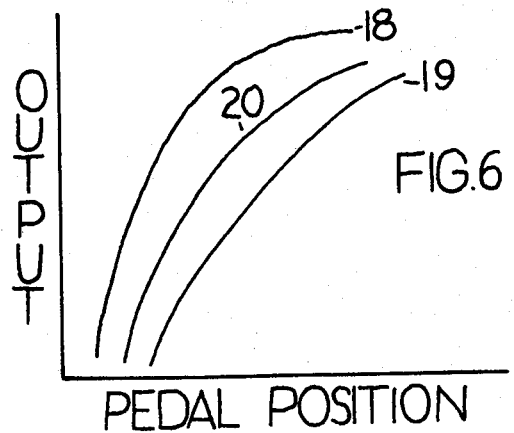
FIG. 6 shows the output response curves of the arrangements of elements shown in FIGS. 3 through 5.

As shown in FIG. 2 the response curve of a DC motor to a linear change in field excitation (here graphed as field current) is very non-linear. By arranging the pivot point (7) of the vane (8) relative to the light source (9) and detector (10), and the relative positions of minimum (16) and maximum (dotted line at 17) acceleration, as shown in FIGS. 3 through 5, the response curve of the control output to the pedal position will change. FIGS. 3 through 5 show several of the alternative arrangements of the movable element (the "vane") and the light source - photodetector combination. The actual arrangement used will vary according to the desired output curve, as will be seen. FIG. 3 shows the arrangement whereby the vane is perpendicular to the axis of the detector and light source, and is moved to a tilted position, producing curve (18) in FIG. 6. FIG. 4 shows that, by raising the pivot, and defining the "rest" position as one tilted downward toward the detector and source, then lifting the vane to the perpendicular position, one can produce curve (19). FIG. 5 shows a vane with the pivot point moved horizontally away from the detector and source, and otherwise arranged as in FIG. 3. This produces curve (20).

The vane may be moved in a linear fashion relative to the light source and photodetector combination, as well as angularly or pivotally as illustrated, depending on the output vs. control movement function desired.

In each of the examples, the output signal from the photodetector is proportional to the distance from the vane to the photodetector/light source combination, as well as the angle of the vane. By the various geometric changes possible in these attributes, the function of the output to pedal (vane) position may be varied.

In this instance, it can be seen that by varying the vane pivot position and vane movement relative to the light source and detector, the curves of the control and the motor may be matched, providing a linear accelerator response relative to motor speed.

The material of which the vane is made is not critical. The only restriction, which further distinguishes the invention from the prior art, is that the surface of the vane must not be completely mirror-like. A mirrored surface results in a beam of light being reflected by the vane, causing a binary "on-off" action rather than the desired continuous function. By using a reflective, but not mirror-like, surface, the reflected light from the light source is both reflected and scattered, causing a useful output from the photodetector.

DESCRIPTION OF THE PREFERRED EMBODIMENT

In the preferred embodiment the light source and photodetector are parts of a single unit such as a Monsanto MCA-7 tape-end sensor module, or equivalent optodetector. This unit is a combined infrared light emitting diode and infrared-sensitive phototransistor in a single case.

The use of infrared light has an advantage over visible light in that the invention becomes less affected by factors influencing the reflectivity of the material used in the vane. The control has been tested with the vane (made of thin aluminum) manually dulled and dirtied to simulate dirt and corrosion, as well as being painted with matte-finish paint, without significant effect on the control operation. Moreover, infrared detection causes the control to be less sensitive to the presence of ambient light in the controller case.

Preferably, the light source and detector are mounted directly on the field controller circuit board, completely eliminating all connective wiring between the detector and the circuit. This minimizes problems with electrical noise pickup on the control lines. The vane and its pivot are preferably incorporated into the box housing the controller, with the connection to the accelerator pedal thus reduced to a mechanical attachment to a crank protruding from the controller box.

It should be noted that the illustrated embodiments have related entirely to motor vehicles. However, those skilled in the art will recognize that the principles herein described and illustrated are applicable to a wide variety of control applications, not limited to electric motor control, wherever a non-linear analog electrical signal in response to a linear movement of a control is desired.

Accordingly, it is to be understood that the embodiments of the invention herein described are merely illustrative of the application of the principles of the invention. References herein to details of the illustrated embodiments are not intended to limit the scope of the claims, which themselves recite those features regarded as essential to the invention.

I claim:

1. A photoelectric controller comprising:
   (a) movable control input means having non-mirror-like light reflective means;
   (b) light source means for shining light at the reflective means;
   (c) detector means for detecting the amount of light from the light source reflecting from the reflective means, producing an output having a magnitude responsive to the amount of light detected;
   (d) the detector means producing an output function relating the motion of the control input means to the magnitude of the output of the detector means;
   (e) the output function being proportional to the geometric arrangement and movement of the reflective means of the control input means, relative to the light source and detector means.

2. The controller of claim 1 in which the output of the light-detecting means is used to control the excitation of a field-controlled motor.

3. The controller of claim 2 as used in an electric vehicle having accelerator pedal means for speed control input by a driver and a field controlled motor for propulsion, in which the movable control input is cooperatively connected to the accelerator pedal means for movement thereby, such that a change in accelerator pedal input results in a change in motor speed.

4. The controller of claim 1 in which the light source means emits, and the detector means detects, infrared light.

5. A photoelectric controller comprising:
   (a) Light scattering reflective means, the position of which is a measure of a mechanical control input;
   (b) a light source means for shining light at the reflective means;
   (c) photodetector means paired with the light source means for detecting the amount of light reflected from the reflective means, and producing an output voltage responsive to the amount of light detected;
   (d) said output voltage being proportional to the distance from the light source and photodetector means pair to the reflective means, and to the angle of the reflective means relative to the light source and photodetector pair;

(e) said output varying relative to the position and movement of the control input, as determined by said angle and distance, in a desired non-linear function;

(f) said function being determined by variation of the geometric arrangement of the reflective means, light source means and photodetector means.

* * * * *